( 12 ) United States Patent
Childs et al.

(10) Patent No.: US 10,505,450 B2
(45) Date of Patent: Dec. 10, 2019

(54) DAC SERVO (71) Applicant: Dialog Semiconductor (UK) Limited, London (GB)

(72) Inventors: Mark Childs, Swindon (GB); Pietro Gallina, Swindon (GB); Vincenzo Bisogno, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/157,162

(22) Filed: Oct. 11, 2018

(65) Prior Publication Data

US 2019/0044444 A1 Feb. 7, 2019

Related U.S. Application Data (62) Division of application No. 14/845,406, filed on Sep. 4, 2015, now Pat. No. 10,116,210.

(51) Int. Cl.
*G05F 1/575* (2006.01)
*H02M 3/158* (2006.01)
(Continued)

(52) U.S. Cl.
CPC ........... *H02M 3/158* (2013.01); *H02M 3/156* (2013.01); *G05F 1/575* (2013.01); *H02M 2001/0025* (2013.01); *H02M 2003/1566* (2013.01)

(58) Field of Classification Search
CPC .. H02M 2001/0025; H02M 2003/1566; G05F 1/575
See application file for complete search history.

(56) References Cited

U.S. PATENT DOCUMENTS 6,331,830 B1 12/2001 Song et al.
6,593,789 B2* 7/2003 Atallah ................ H03K 5/1565
327/175
(Continued)

OTHER PUBLICATIONS

German Office Action, File No. 10 2015 225 829.7, Applicant: Dialog Semiconductor (UK) Limited, dated Sep. 9, 2016, 6 pages and English language translation, 8 pages.
(Continued)

*Primary Examiner* — Harry R Behm
(74) *Attorney, Agent, or Firm* — Saile Ackerman LLC; Stephen B. Ackerman (57) ABSTRACT A servo block in a Buck, Boost, or switching converter allows a positive offset to be applied to the DAC voltage. In a typical switching converter application, the load will have a positive current, sourced from the switching converter to ground through the load. This will cause the output voltage of the switching converter to fall with the output impedance. The servo block corrects the output voltage by adjusting the DAC voltage upwards. In the case where current is forced back into the switching converter, causing the output voltage to rise, the servo block will have affect. The behavior of the servo block is desirable as it reduces the negative affect the servo block may have on load transients occurring when the switching converter is in over voltage. In particular, the idea of shifting the DAC voltage for several different loops with a single servo block is disclosed. This scheme is particularly effective for a switching converter design, allowing the slow loop integrator and fast existing switching converter control loops to be considered almost independently.

5 Claims, 8 Drawing Sheets (51) Int. Cl.
*H02M 3/156* (2006.01)
*H02M 1/00* (2006.01)

(56) References Cited

U.S. PATENT DOCUMENTS

| | | | |
|---|---|---|---|
| 8,970,289 B1* | 3/2015 | Lee | G05F 1/46 |
| | | | 327/534 |
| 2006/0061412 A1 | 3/2006 | Molina et al. | |
| 2006/0273772 A1 | 12/2006 | Groom | |
| 2010/0208789 A1 | 8/2010 | Cooke | |
| 2011/0018507 A1 | 1/2011 | McCloy-Stevens et al. | |
| 2014/0077781 A1 | 3/2014 | Murakami et al. | |
| 2014/0139198 A1* | 5/2014 | Manlove | H02M 3/156 |
| | | | 323/282 |
| 2015/0035563 A1 | 2/2015 | Nazemi et al. | |
| 2015/0377933 A1* | 12/2015 | Alcouffe | G01R 19/257 |
| | | | 324/126 |
| 2016/0103463 A1* | 4/2016 | Wang | G05F 3/262 |
| | | | 323/313 |

OTHER PUBLICATIONS

"Dithering Skip Modulation, Width and Dead Time Controllers in Highly Efficient DC-DC Converters for System-on-Chip Applications," by Hong-Wei Huang et al., IEEE Journal of Solid-State Circuits, vol. 42, Issue: 11, Published: Oct. 22, 2007, pp. 2451-2465.

* cited by examiner

DAC SERVO

This application is a Divisional application of (DS14-098) U.S. application Ser. No. 14/845,406, filed on Sep. 4, 2015, owned by a common assignee and which is herein incorporated by reference in its entirety.

BACKGROUND OF THE INVENTION

Field of the Invention

This invention relates generally to Buck, Boost, and other types of switching converters, obtaining high DC-gain in the switching converters.

Description of Related Art

DC-DC converters are important in portable electronic devices such as cellular phones and laptop computers, which are supplied with power from primarily batteries. Such electronic devices often contain several sub-circuits, each with its own voltage level requirement different from that supplied by the battery or an external supply. Additionally, the battery voltage declines as its stored energy is drained. Switched DC-DC converters offer a method to increase voltage from a partially lowered battery voltage, thereby saving space instead of using multiple batteries to accomplish the same goal.

Electronic switch-mode DC-DC converters convert one DC voltage level to another, by storing the input energy temporarily and then releasing that energy to the output at a different voltage. The storage may be in a magnetic field storage component such as an inductor. This conversion method is more power efficient and beneficial to increasing the running time of battery-operated devices.

Most DC-DC converters regulate the output voltage and use an integrator in the control loop for achieving high DC-gain in the switching converter. Drawbacks of these types of switching converters include complexity, electronic noise and to some extent cost, although this has come down with advances in chip design. Conventional designs require large capacitors and allow only high gain in pulse-width modulation mode. Many Bucks, Boosts, and other types of switching converters operate in multiple modes, and a traditional scheme would not account for this.

SUMMARY OF THE INVENTION

An object of this disclosure is to implement a Buck, Boost, or other switching converter with a Digital-to-Analog Converter (DAC), by adding a servo block between the DAC and the control loops of the switching converter. The DAC voltage is modified using a slow loop integrator to remove any DC offset at the output of the switching converter. This scheme implements the servo block separately without affecting the existing control loops of the switching converter. The modular design of the servo makes it easy to control all loops with one design.

Further, another object of this disclosure is to achieve a very high DC loop gain for a Buck, Boost, or other switching converters in all modes of operation.

Still further, another object of this disclosure is to provide a very high DC loop gain using a small capacitor.

To accomplish at least one of these objects, a Buck, Boost, or other switching converter is implemented, consisting of an output stage driven by switching logic, with a servo block configured between the DAC and the control loops of the switching converter. A DAC voltage is input to the servo block, in addition to the feedback voltage, the output of the switching converter. The feedback voltage is compared with the DAC voltage. The DAC voltage is modified, and passed to the control loops of the switching converter, removing error. The DAC voltage is modified for several different loops with a single servo block, allowing the servo block and the switching converter control loops to be considered independently.

In various embodiments, this may be achieved using an integrator or by using a more elegant block design.

In other embodiments, the servo may be implemented using a successive approximation scheme or in digital.

DETAILED DESCRIPTION OF THE INVENTION

In a traditional current-mode Buck converter, the buck current is regulated proportional to the error voltage VEA, the difference between the DAC output voltage VDAC and the feedback voltage VFB voltage across the capacitor of the output stage of the Buck converter. An error amplifier is implemented by comparing its voltage output to a replica of the coil current in the Buck converter.

The error amplifier is often provided with a capacitive feedback path to create a very high DC gain, forming an integrator. This scheme often requires a very large capacitor to ensure the Buck converter remains stable. This capacitor, if integrated into the silicon die, may often be very large and difficult to integrate.

Different modes of operation are required in the Buck converter. At high loads, Pulse-width modulation (PWM) is the preferred mode of operation. At low loads, Pulse-frequency modulation (PFM) is the preferred mode of operation. At intermediate loads, and in transient cases, the Buck converters may operate in a dynamic PFM mode.

The traditional method of implementing high DC gain would not be effective in PFM and dynamic PFM modes.

The output voltage would suffer substantial transients as the Buck converter moved between modes. What is needed is for high DC gain to be guaranteed under all modes of operation.

Figure 1:
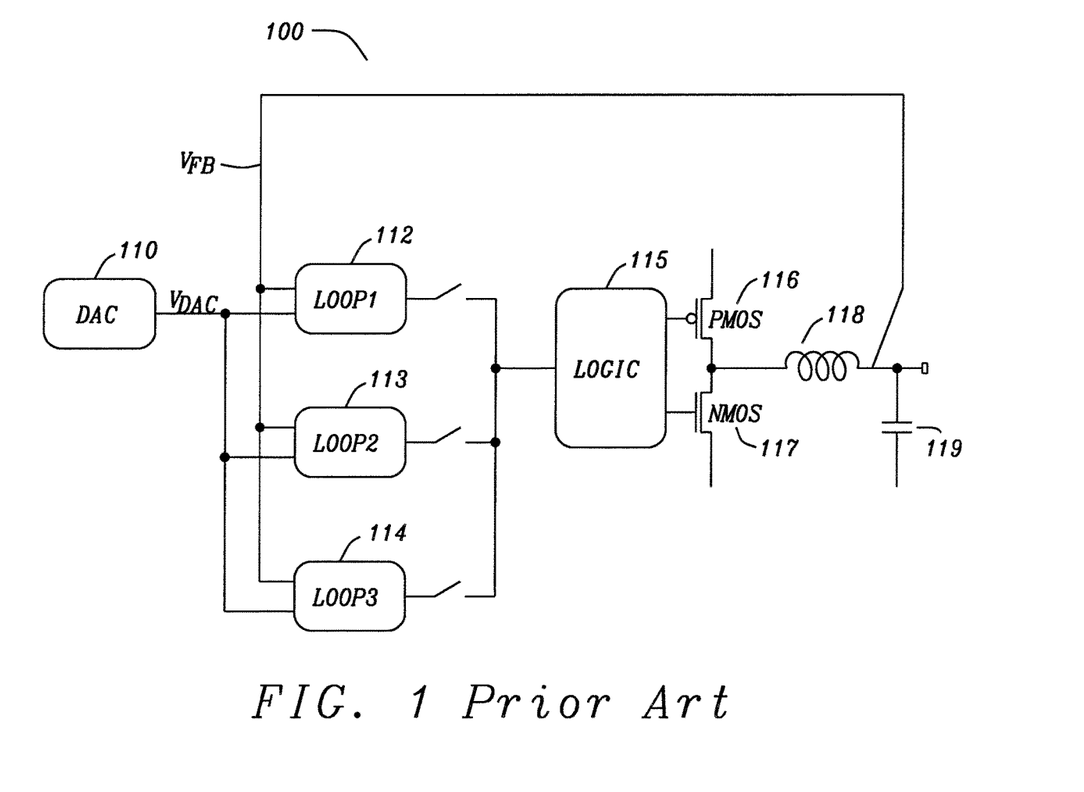
FIG. 1 is a block diagram illustrating an exemplary Buck switching converter consisting of an output stage driven by switching logic.

FIG. 1 is a block diagram illustrating an exemplary Buck switching converter consisting of an output stage driven by switching logic. The output stage consists of PMOS transistor 116, NMOS transistor 117, coil 118 and capacitor 119. Switching LOGIC 115 takes control data from one of several control loops. In the diagram, LOOP1, LOOP2, and LOOP3 indicate sync mode (PWM) 112, sleep mode (PFM) 113, and dynamic sleep mode (continuous conduction mode PFM) 114 respectively. Each control loop takes feedback voltage VFB, the output voltage of the converter, and DAC 110 output voltage VDAC, as inputs. The DAC voltage is the target output voltage for the Buck converter.

In a traditional current-mode Buck converter, LOOP1 may be a current mode PWM loop. This loop may contain an error amplifier. Often this error amplifier is provided with a high DC gain using some form of integrator. This would then give very high accuracy control of the output voltage and very low output impedance for the Buck converter in this mode. However, this circuit would have no effect on the other loops. So when another loop is selected in a different mode, an alternative method would have to be implemented to ensure high DC gain.

Figure 2:
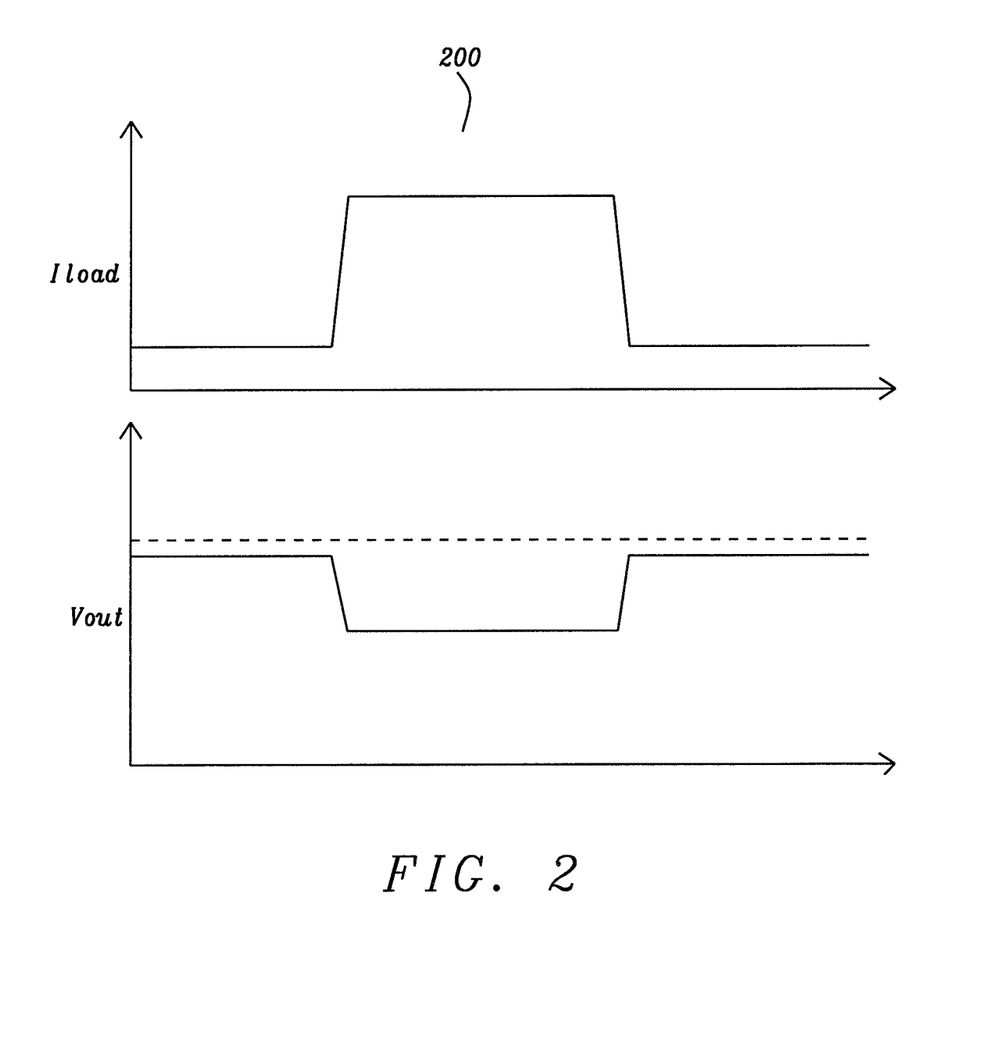
FIG. 2 is a signal diagram of a Buck switching converter with an output stage driven by switching logic, and without a servo block configured between the DAC and the control loops.

FIG. 2 is a signal diagram of a Buck switching converter with an output stage driven by switching logic, and without a servo block configured between the DAC and the control loops. In this diagram, a load step ILOAD is applied to the Buck switching converter. This load step causes the output voltage VOUT to fall. This load regulation reflects the finite output impedance of the Buck switching converter.

Figure 3:
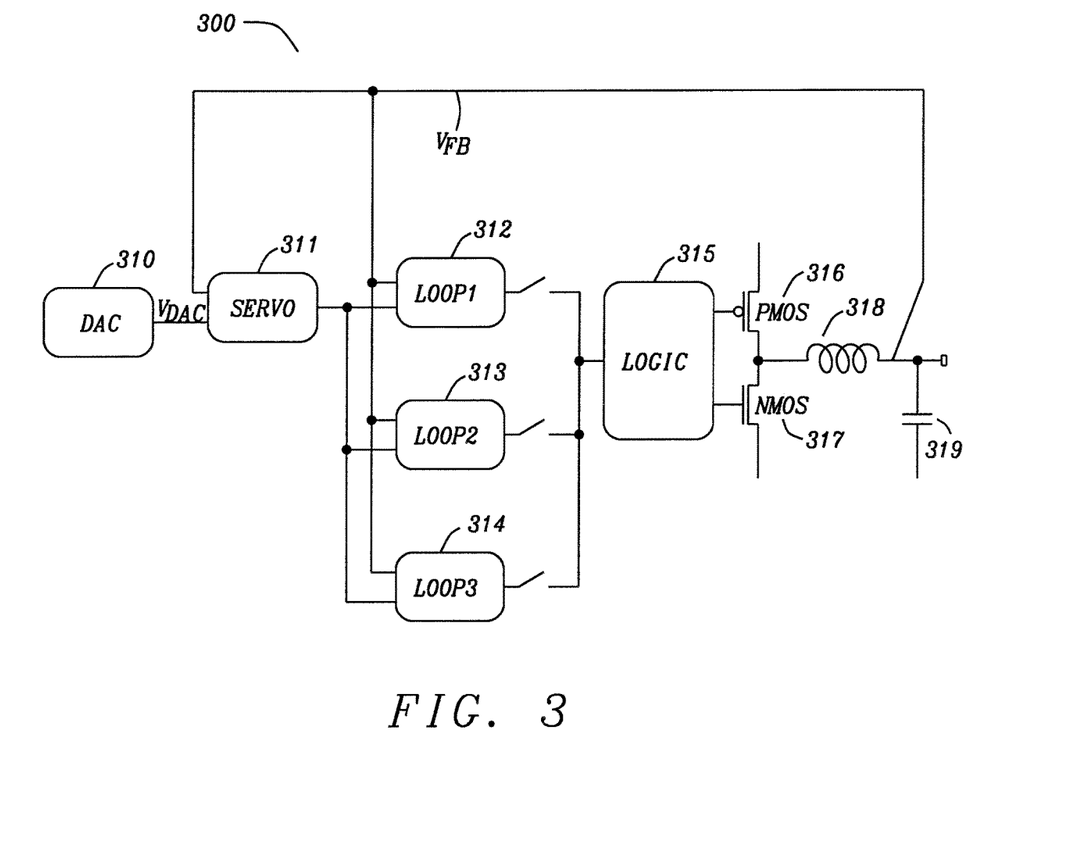
FIG. 3 is a block diagram illustrating a Buck switching converter of the disclosure, consisting of an output stage driven by switching logic, with a servo block configured between the DAC and the control loops of the switching converter.

FIG. 3 is a block diagram illustrating a Buck switching converter of the disclosure, consisting of an output stage driven by switching logic, with a servo block configured between the DAC and the control loops. The output stage consists of PMOS transistor 316, NMOS transistor 317, coil 318 and capacitor 319. Switching LOGIC 315 takes control data from one of several control loops. In the diagram, LOOP1, LOOP2, and LOOP3 indicate sync mode (PWM) 312, sleep mode (PFM) 313, and dynamic sleep mode (continuous conduction mode PFM) 314 respectively. Each control loop takes feedback voltage VFB, the voltage across capacitor 319, and the output of servo 311, as inputs. Inputs to servo 311 are feedback voltage VFB, and DAC voltage VDAC 310, the target output voltage for the Buck converter.

The proposed solution is achieved by adding the servo block between the DAC and the control loops. Now the DAC voltage VDAC is modified using a slow loop integrator to remove any DC offset at the output of the converter. This scheme is convenient for a number of reasons. It is easier to implement the slow loop integrator separately without affecting the existing loops, and its modular design makes it easy to control all loops with one design.

The servo block compares the feedback voltage VFB, equal to the converter output voltage at the output of the Buck converter, with the raw DAC voltage VDAC 310. If the output voltage of the Buck converter is lower than the raw DAC voltage then the modified DAC voltage passed to the control loops, the output of servo block 311, VSERVO, is increased slowly to remove this error.

Figure 4:
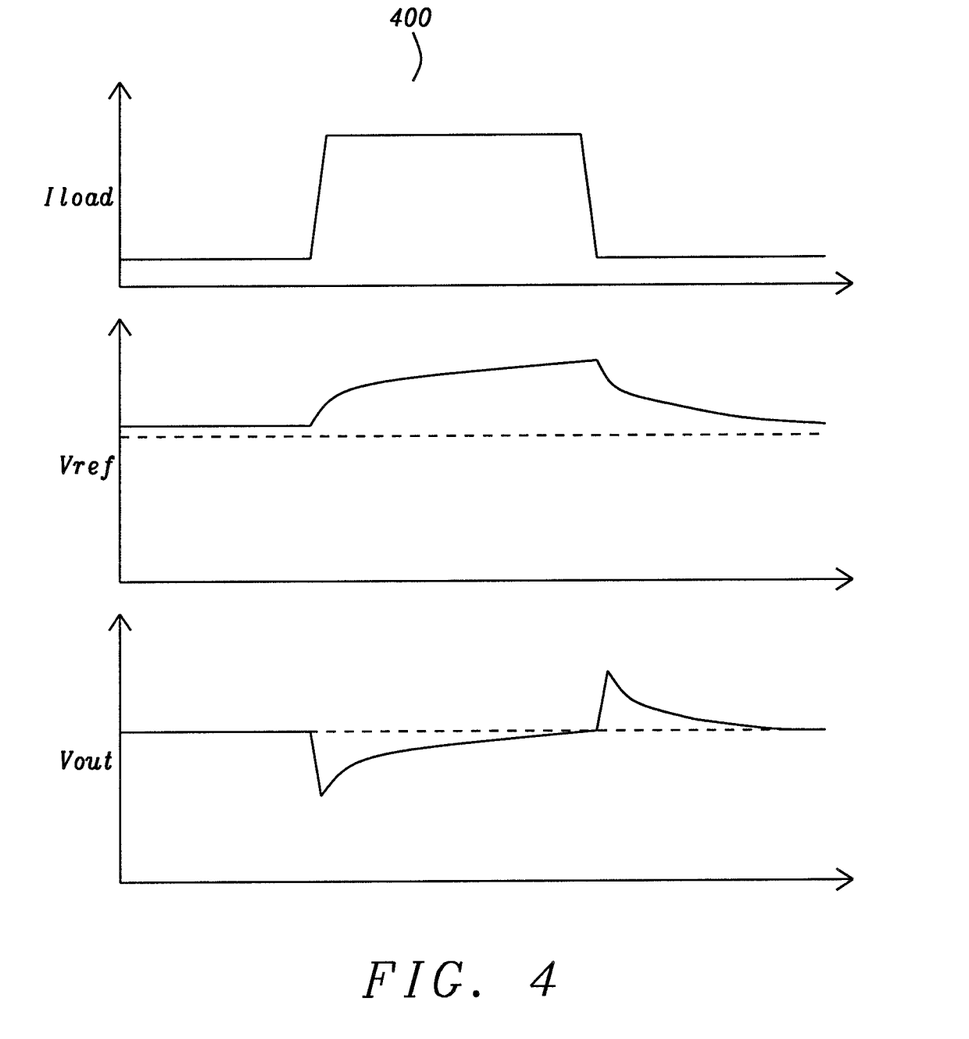
FIG. 4 is a signal diagram of a Buck switching converter with an output stage driven by switching logic, and a servo block configured between the DAC and the control loops of the switching converter.

FIG. 4 is a signal diagram of a Buck switching converter with an output stage driven by switching logic, and a servo block configured between the DAC and the control loops of the switching converter. Load current ILOAD initially causes the switching converter output voltage VOUT to fall as in FIG. 2, and the DAC servo loop causes the switching converter reference voltage VREF to rise. (The raw DAC voltage is represented by dashed line VREF). As the reference voltage VREF rises, output voltage VOUT also rises. When the output voltage VOUT is identical to the DAC voltage, the reference voltage VREF stops rising.

Figure 5:
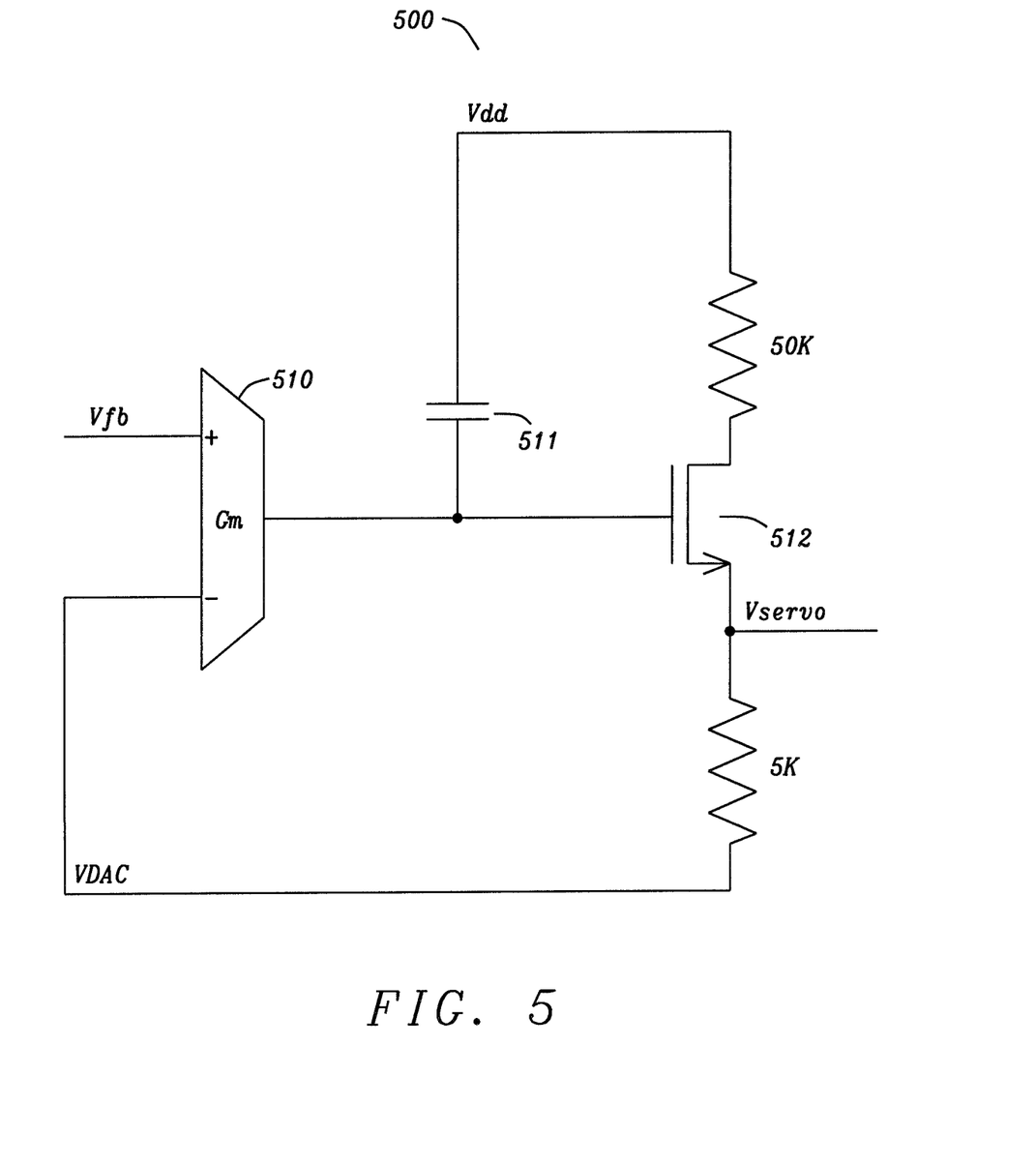
FIG. 5 is a circuit diagram illustrating the preferred implementation of the servo block in a Buck switching converter, embodying the principles of the disclosure.

FIG. 5 is a circuit diagram illustrating the preferred implementation of the servo block in a Buck switching converter, embodying the principles of the disclosure. In this design, servo block 500 consists of a first GM stage 510, with inputs feedback voltage VFB and DAC voltage VDAC. The first GM stage 510 drives the output current to capacitor 511. The voltage on capacitor 511 then controls a second GM stage, implemented using PMOS transistor 512 in saturation. The output current from PMOS transistor 512 flows through a 5KΩ resistor connected to DAC voltage VDAC. The voltage across this resistor is added to the DAC voltage to give a controlled offset to output servo voltage VSERVO. The smaller the voltage on capacitor 511, the greater the current in PMOS transistor 512 and the greater the offset to DAC voltage VDAC in VSERVO. A 50KΩ resistor connects supply voltage VDD to the source of PMOS transistor 512.

The preferred implementation of the servo block in the disclosed Buck converter design allows a positive offset to be applied to the DAC voltage. In a typical Buck converter application, the load will have a positive current, sourced from the Buck converter to ground through the load. This will cause the output voltage of the Buck converter to fall with the output impedance. The servo corrects this by adjusting the DAC voltage upwards. However, in the case where current is forced back into the Buck converter, causing the output voltage to rise, the servo will have affect. This behavior of the servo is desirable as it reduces the negative affect the servo block may have on load transients occurring when the Buck converter is in over voltage.

In addition, the preferred implementation of the servo block in the disclosed Buck converter design allows the DAC voltage to be varied freely, for example during DAC ramping, to shift the output voltage of the Buck converter in a controlled way. As the DAC output voltage ramps, the offset to the output servo voltage follows, and the servo itself does not need to track this change.

Figure 6:
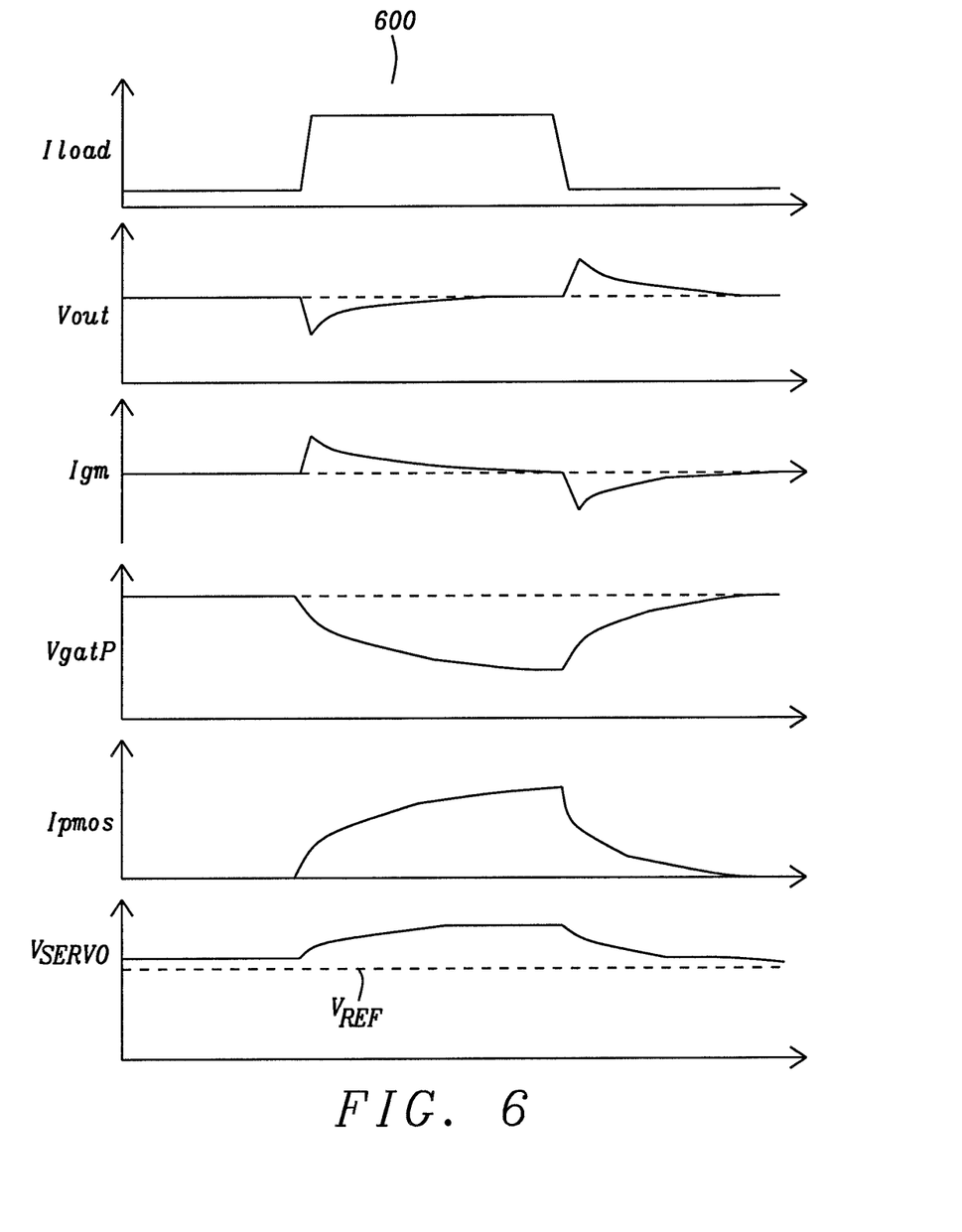
FIG. 6 is a signal diagram of the preferred implementation of the servo block of the Buck switching converter in FIG. 5, embodying the principles of the disclosure.

FIG. 6 is a signal diagram of the preferred implementation of the servo block of the Buck switching converter in FIG. 5, embodying the principles of the disclosure. A load step ILOAD is applied to the Buck switching converter, causing the output voltage VOUT to initially fall, and the current gm IGM to suddenly increase. This pulls down gate voltage VGATP on PMOS device 512, which in turn causes current IPMOS to flow. Current IPMOS offsets reference voltage VREF above the raw DAC voltage, causing output voltage VOUT of the Buck switching converter to rise. (The raw DAC voltage is represented by dashed line VREF)

Figure 7:
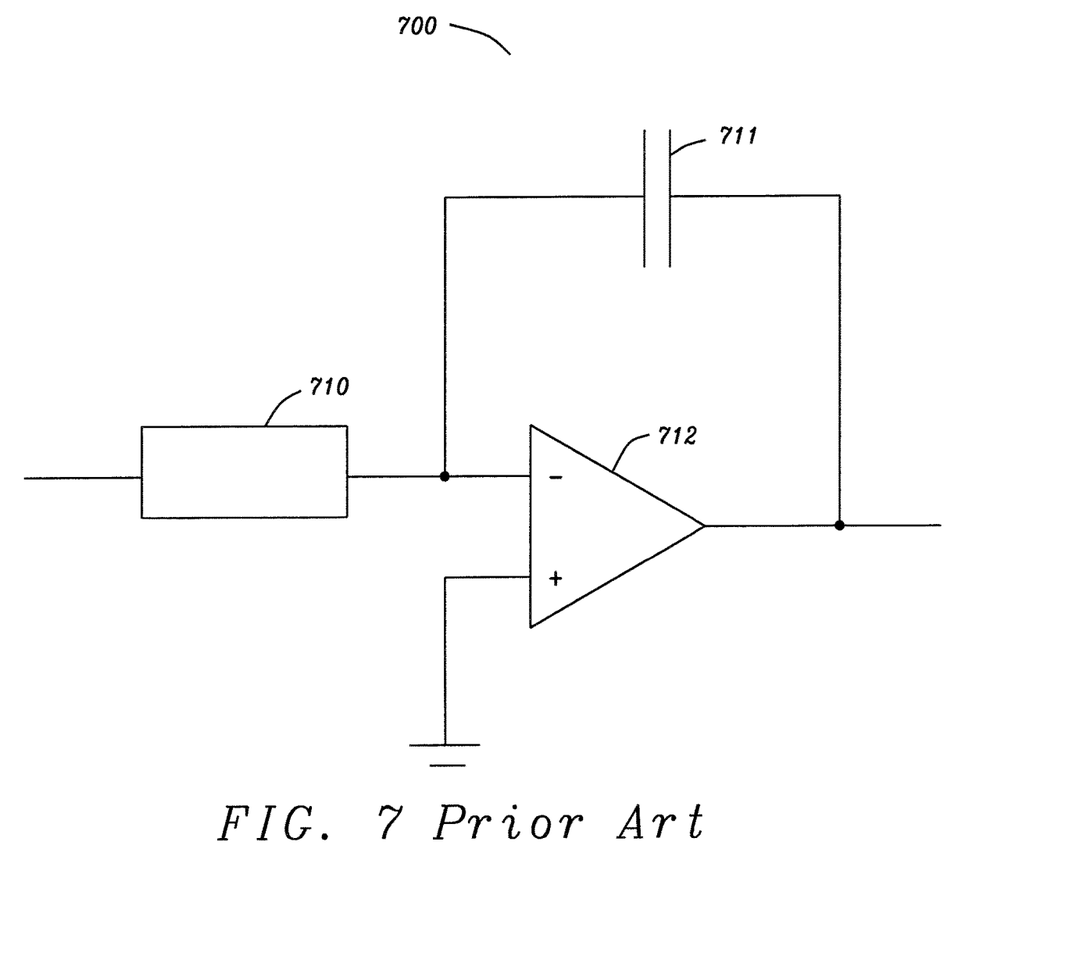
FIG. 7 is a circuit diagram illustrating a traditional integrator design using an operational amplifier.

FIG. 7 is a circuit diagram illustrating a traditional integrator design using operational amplifier 712, and input impedance 710. The circuit of FIG. 5 has several key benefits over that of the traditional integrator design given in FIG. 7. Depending on the gain of the output GM stage, implemented with PMOS transistor 512, the size of capacitor 511 may be reduced substantially over that of capacitor 711.

The preferred implementation of the servo block in the disclosed Buck converter design is most relevant to a system where the Buck converter has several modes of operation, or several control loops, all sharing a single DAC output voltage. However, the proposal may also be useful for any Buck converter design with a finite loop gain and substantial effective output impedance.

The DAC servo is designed to shift the effective DAC output voltage into an existing Buck converter design. In particular the idea describes the shifting of the DAC output voltage for several control loops with a single servo block. This scheme is particularly effective for a design that allows the slow loop integrator and the fast existing Buck converter control loops to be considered almost independently.

The preferred implementation of the servo circuit block, from the basic architectural design, to the actual circuit implementation is unique and overcomes several issues encountered during the typical design. In addition, the DAC output voltage is only shifted upward and not downward, removing any drop in the output voltage of the Buck converter.

Figure 8:
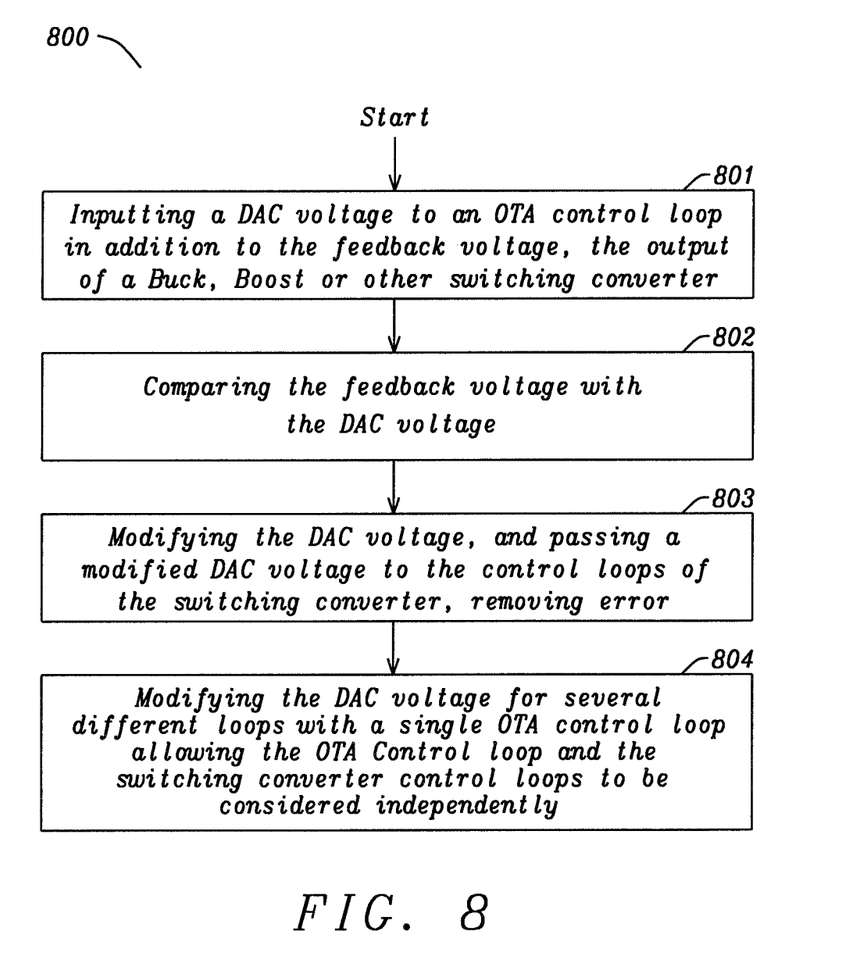
FIG. 8 illustrates a flowchart of a method for implementing a Buck switching converter consisting of an output stage driven by switching logic, with a servo block configured between the DAC and the control loops of the Buck converter.

FIG. 8 illustrates flowchart of a method 800 for implementing a Buck, Boost, or other switching converter, consisting of an output stage driven by switching logic, with a servo block configured between the DAC and the control loops of the switching converter. Step 801 illustrates inputting a DAC voltage to said servo block, in addition to the feedback voltage, the output of said switching converter. Step 802 shows comparing said feedback voltage with said DAC voltage. Step 803 illustrates modifying said DAC voltage, and passing a modified DAC voltage to the control loops of said switching converter, removing error. Step 804 shows modifying said DAC voltage for several different loops with a single servo block, allowing said servo block and said switching converter control loops to be considered independently.

The advantages of one or more embodiments of the present disclosure include the circuit implementation, in the fact that it is simple, adjusting the reference voltage of the switching converter and guaranteeing that it may only be adjusted in one direction, and that it reduces the size of the capacitor needed when compared to a simple integrator. The main advantage of the present disclosure is that it increases the accuracy of the switching converter, due to the DC gain provided by the DAC servo. If for example, one mode of operation of the switching converter has nearly infinite DC gain, then the output of the servo circuit block will be very close to the DAC voltage output. If the gain of the first loop of the switching converter were limited, the added servo circuit block will adjust itself to reduce the net difference between the DAC output voltage and the feedback voltage VFB. The preferred implementation of the reference trimming by the servo circuit block guarantees that the modification of the switching converter output voltage is always in the positive direction.

While this invention has been particularly shown and described with reference to the preferred embodiments thereof, it will be understood by those skilled in the art that various changes in form and details may be made without departing from the spirit and scope of the invention.

The invention claimed is:

1. A servo block, for a switching converter, comprising a first GM stage, with a non-inverting input configured to a feedback voltage and an inverting input configured to a DAC voltage, wherein said first GM stage has an output connected to a capacitor, and to the gate of a second GM stage, said second GM stage comprising a transistor; and wherein a voltage across a 5KΩ resistor is added to said DAC voltage to give a controlled offset to said servo block output voltage.

2. The servo block of claim 1, wherein said capacitor is connected to a supply voltage and a 50KΩ resistor.

3. The servo block of claim 2, wherein said second GM stage has its source configured to said 50KΩ resistor and its drain connected to said 5KΩ resistor.

4. The servo block of claim 1, wherein a successive approximation scheme, for an digital-to-analog converter, employs said servo block.

5. The servo block of claim 1, wherein said servo block is configured so that said switching converter output voltage is always in the positive direction.

* * * * *